(12) United States Patent
Shim et al.

(10) Patent No.: US 10,324,943 B2
(45) Date of Patent: Jun. 18, 2019

(54) AUTO-MONITORING AND ADJUSTMENT OF DYNAMIC DATA VISUALIZATIONS

(71) Applicant: Business Objects Software Ltd., Dublin (IE)

(72) Inventors: Sybil Shim, Vancouver (CA); Daniel Georges, San Francisco, CA (US); Charles Wilson, Calgary (CA); Paul van der Eerden, Vancouver (CA); Saeed Jahankhani, Vancouver (CA)

(73) Assignee: Business Objects Software, Ltd., Dublin (IE)

( * ) Notice: Subject to any disclaimer, the term of this patent is extended or adjusted under 35 U.S.C. 154(b) by 369 days.

(21) Appl. No.: 14/822,776

(22) Filed: Aug. 10, 2015

(65) Prior Publication Data

US 2017/0046404 A1  Feb. 16, 2017

(51) Int. Cl.
*G06F 16/00* (2019.01)
*G06F 16/248* (2019.01)
*G06F 16/9535* (2019.01)

(52) U.S. Cl.
CPC ........ *G06F 16/248* (2019.01); *G06F 16/9535* (2019.01)

(58) Field of Classification Search
CPC combination set(s) only.
See application file for complete search history.

(56) References Cited

U.S. PATENT DOCUMENTS

| | | | |
|---|---|---|---|
| 5,161,103 A | 11/1992 | Kosaka et al. | |
| 5,969,704 A * | 10/1999 | Green | G06Q 30/02 345/474 |
| 6,233,256 B1 * | 5/2001 | Dieterich | H04J 3/0632 370/506 |
| 6,965,886 B2 | 11/2005 | Govrin et al. | |
| 7,265,663 B2 | 9/2007 | Steele | |
| 7,667,604 B2 | 2/2010 | Ebert et al. | |
| 8,160,996 B2 | 4/2012 | Lo et al. | |
| 8,650,150 B2 | 2/2014 | Zhao et al. | |
| 8,682,816 B2 | 3/2014 | Ruhl et al. | |
| 8,719,266 B2 | 5/2014 | West | |
| 8,738,650 B2 | 5/2014 | Bawa et al. | |
| 8,762,324 B2 | 6/2014 | Thollot et al. | |
| 8,768,825 B2 | 7/2014 | Mauro | |
| 9,286,230 B1 * | 3/2016 | Zhang | G06F 3/06 |
| 2004/0201618 A1 * | 10/2004 | Alderson | G06F 17/30902 715/744 |

(Continued)

*Primary Examiner* — Etienne P Leroux

(74) *Attorney, Agent, or Firm* — Klarquist Sparkman, LLP

(57) ABSTRACT

Examples of auto-monitoring and adjusting dynamic data visualizations are provided herein. A data visualization based on initial data can be generated. A series of data updates can be received. The data visualization can be updated based on the series of data updates. Various performance metrics can be monitored, and data updates and/or the updated data visualization can be adjusted accordingly. Performance metrics can include at least one of: a data visualization rendering time; a data transfer time; or a data update generation time. Upon determining that one or more performance metrics exceed a threshold: a time between data updates of the series of data updates can be increased; sampled data can be requested for subsequent data updates; and/or a time-dimension extent of the updated data visualization can be reduced.

20 Claims, 8 Drawing Sheets

(56) References Cited

U.S. PATENT DOCUMENTS

| | | | |
|---|---|---|---|
| 2006/0062293 A1* | 3/2006 | Kaye | H04N 21/2365 375/240.03 |
| 2008/0270513 A1* | 10/2008 | Fujiwara | G11B 20/00086 709/201 |
| 2010/0066743 A1* | 3/2010 | Fortmann | G01P 1/07 345/440.1 |
| 2011/0302196 A1* | 12/2011 | Bouillet | G06F 17/30516 707/769 |
| 2012/0130940 A1 | 5/2012 | Gattani et al. | |
| 2013/0013552 A1 | 1/2013 | Eshleman et al. | |
| 2013/0106927 A1* | 5/2013 | Seo | H04N 13/341 345/691 |
| 2013/0204927 A1* | 8/2013 | Kruglikov | G06F 9/54 709/203 |
| 2013/0254160 A1* | 9/2013 | Rose | G06F 17/30554 707/609 |
| 2014/0278086 A1 | 9/2014 | Filippo et al. | |
| 2015/0278315 A1* | 10/2015 | Baumgartner | G06F 17/30554 715/763 |

* cited by examiner

AUTO-MONITORING AND ADJUSTMENT OF DYNAMIC DATA VISUALIZATIONS

BACKGROUND

Analytics software has been increasingly used to analyze and interpret large amounts of data. Visualization applications, for example, can provide graphical representations of different aspects of data to allow a user to understand complicated relationships. While visualization applications offer advanced tools and functionality for visualizing data, conventional visualization applications typically struggle or fail to keep pace with large amounts of data or rapidly changing data.

DETAILED DESCRIPTION

The examples described herein generally allow automatic monitoring and adjustment of dynamic data visualizations. Data visualizations provide easy-to-understand, graphical representations of data that are useful for data analysis. Typical conventional data visualization applications perform well for static data but can have difficulty handling dynamic data, particularly large amounts of rapidly changing data. For example, if a data visualization representing tens of thousands of data points is generated, and thousands of additional data points are added to the underlying data every few seconds, a data visualization application can have difficulty processing updated data and rendering an updated visualization before the next update is available.

In the described examples, various performance metrics related to a data visualization can be monitored, and adjustments can be made to data updates and/or to a data visualization that allow a data visualization application to both keep the data visualization current and meaningfully represent the data. The described examples represent a significant advance in the field of data visualization, allowing visualization of rapidly changing and/or high-volume data while consuming fewer computing resources in the course of generating and updating data visualizations. The described examples also save network bandwidth by reducing the amount of data transferred. The described techniques are also vital to satisfy the new demand for computationally efficient data visualization that has specifically arisen with the advent of cloud storage, web applications, and Internet-based services. Examples are described below with reference to FIGS. 1-8.

Figure 1:
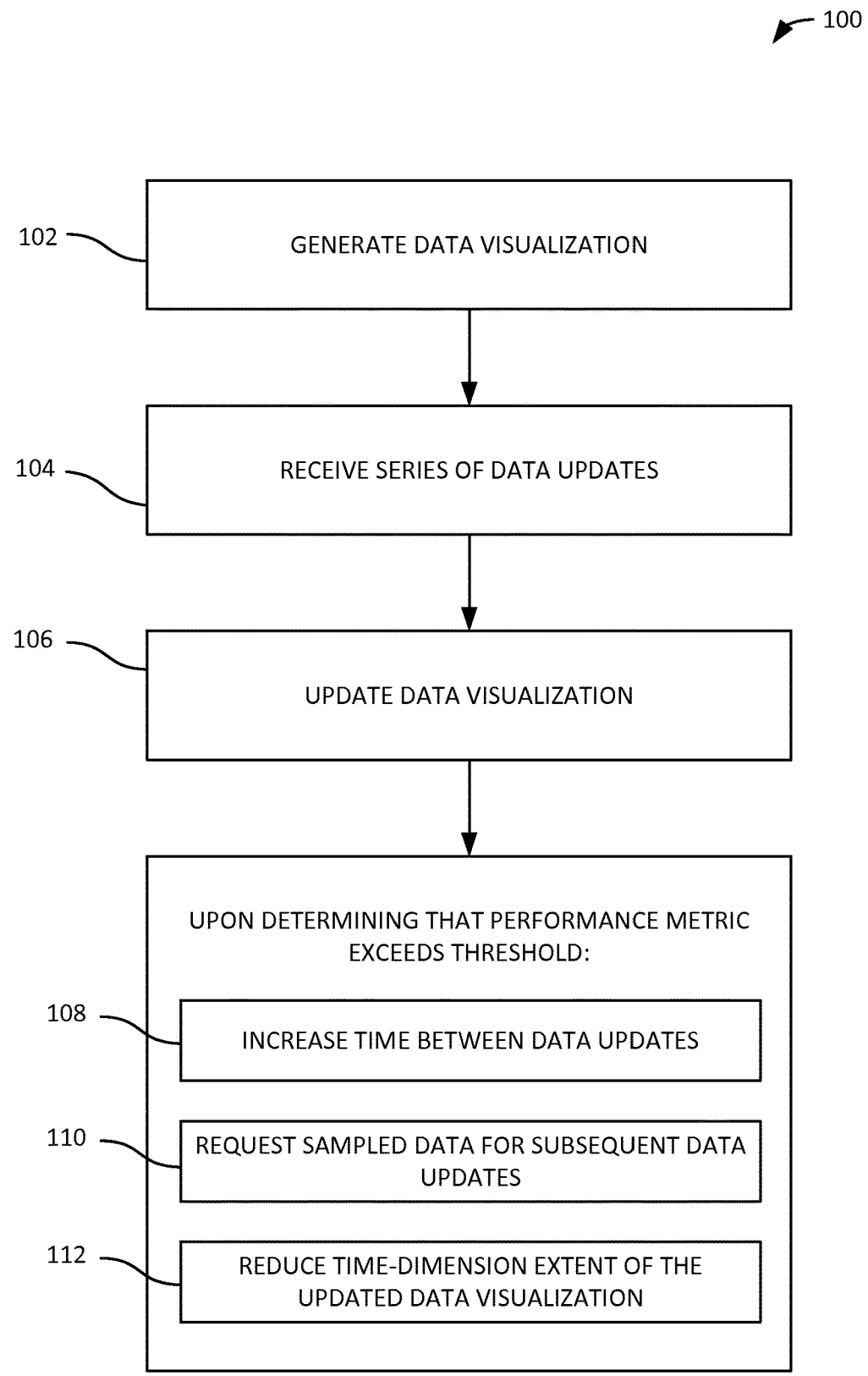
FIG. 1 illustrates an example method for monitoring and adjusting a dynamic data visualization.

FIG. 1 illustrates a method 100 for automatically monitoring and adjusting a dynamic data visualization. In process block 102, a data visualization is generated. A data visualization is a graphical representation of data, such as a chart, graph, or table. Data visualizations have one or more data visualization types, which can be, for example, a stacked column chart, a column chart, a three-dimensional column chart, a line chart, an area chart, a table, a pie chart, a donut chart, or other visualization types. The data represented by a data visualization can be specified, for example, in a visualization request. A visualization request can be specified by a user through a data visualization application or other software application having data visualization functionality. Such applications can be web applications provided over the Internet or can be installed on local computers or server computers accessible over a local area network (LAN) or other network. The data visualization application can query a database, such as an in-memory, columnar relational database or other data store, to retrieve data corresponding to the visualization request.

In process block 104, a series of data updates is received. Data updates can be received, for example, as an aggregated tuple or other format. The data visualization is updated in process block 106 based on the series of data updates. The data updates can be received in response to update queries sent from a data visualization application. The update queries can be periodic, for example. In some examples, an initial query specifies that updates are to be sent periodically. The updates to the data visualization in process block 106 can be made each time a data update of the series is received in process block 104.

The data upon which the data visualization is based can be frequently changing and/or high-volume data, which can be referred to as "high-velocity" data. In order to keep a data visualization up-to-date, frequent updates are used to reflect the frequent changes in the data. High-velocity data typically strains or overwhelms the computing devices and network connections used to receive and process the data. Depending upon the rendering/processing ability of the computer(s) involved in generating updated data visualizations, updates can be received so frequently that an updated data visualization has not even been generated by the time a subsequent data update has been received. In such cases, the data visualization lags the data that the visualization represents and does not represent the current state of the data.

Similarly, a data update can contain so many data points (e.g., data records) that the processing time (e.g., by a backend server) needed to retrieve and sort, sample, or otherwise process and return the data in a query response exceeds the time between data updates such that by the time a data update reaches the data visualization application, the data is already several updates out-of-date. A large number of data points can also cause a data transfer time to exceed a time between updates. For example, a transfer time between a data store (e.g., on one or more server computers) and a data visualization application (e.g., running on a client device) can exceed the time between updates, resulting in an updated data visualization based on the transferred data already being out-of-date when the data visualization is updated.

Various performance metrics can be monitored in method 100, and various actions can be taken in response to the monitoring. Upon determining, based on at least one of the updating of the data visualization in process block 106 or a data update of the series of data updates received in process block 104, that a performance metric exceeds a threshold, at least one of process blocks 108, 110, or 112 are performed. A different threshold can be established for the respective performance metrics, and a determination of which of process block 108, 110, or 112 are performed can depend upon the performance metric that exceeds its corresponding threshold. In process block 108, a time between data updates of the series of data updates is increased. In process block 110, sampled data is requested or generated for subsequent data updates of the series of data updates. Sampling data (e.g., selecting every second, third, fourth, etc. data point; averaging; or other sampling technique) allows fewer data points to be transmitted and rendered while still representing the overall trend of the data.

In process block 112, a time-dimension extent of the updated data visualization is reduced. The "time-dimension extent" refers to, for example, a time axis of a data visualization. For example, for an initial data visualization that represents data corresponding to time values on one axis (e.g., the y-axis) with the time values on another axis (e.g., the x-axis), where the time axis extends between zero seconds and 10 seconds (a ten-second window size), reducing the time-dimension extent of an updated visualization (updated to reflect another five seconds of data) can result in the updated visualization reflecting data from, for example, seven or eight seconds to 15 seconds (an eight- or seven-second window size). Reducing the time-dimension extent of a window provides less information and perhaps less context to the user (in the above example, rather than representing all data from zero to 15 seconds, the updated data visualization only displays from seven or eight seconds to 15 seconds), but reducing the time-dimension extent reduces the amount of data to process and to transfer and allows faster rendering.

The performance metrics that are monitored can include at least one of: a data visualization rendering time; a data transfer time from one or more server computers; or a data update generation time. In some examples, when the performance metric is a data visualization rendering time, and it is determined that the rendering time exceeds a threshold (e.g., a time threshold), the time between data updates is increased. The time between data updates can be increased to, for example, a time greater than the rendering time. This allows sufficient time for the rendering to complete before another update is requested and/or received.

In some examples, when the performance metric is a data transfer time, from one or more server computers to a client computer, of a data update of the series of data updates, and it is determined that the data transfer time exceeds the threshold, sampled data is requested for subsequent data updates of the series of data updates. Sampled data results in fewer data points, which reduces the data transfer time. In some examples, if a data visualization application and the data store storing the data requested by the data visualization application are on a same computer(s), updated data is sampled rather than sampled data being requested. Alternatively or additionally, a time between updates is reduced. Reducing the time between updates results in more frequent updates, which limits the amount of new or changed data that must be transferred with each update. New or updated data can be identified as data with, for example, a time stamp after the time of a previous update.

In some examples, when the performance metric is a data update generation time, at one or more server computers, of a data update of the series of data updates, and it is determined that the data update generation time exceeds the threshold, a time-dimension extent of the updated data visualization is reduced and/or sampled data is requested for subsequent data updates.

Some data does not have a time aspect. For such data, a time dimension can be added (e.g., as an additional column, etc.). For example, adding time as a dimension in an online analytical processing (OLAP) cube allows "slicing" of data stored in the cube for values of time. Slicing of data stored in the cube can be, for example, used to generate data for a data update.

The choice of which of process blocks 108, 110, and/or 112 are performed can be driven by user preferences. For example, some users may prefer to view the entire time-dimension extent of data in the data visualization. For such users, process blocks 108 and/or 110 can be performed rather than or before the time-dimension extent of the updated data visualization is reduced in process block 112. Similarly, if a user is more concerned with the most recent data and/or viewing the most recent data at a fine granularity, then process block 112 can be performed prior to or instead of increasing the time between updates in process block 108 and/or requesting sampled data in process block 110.

Figure 2:
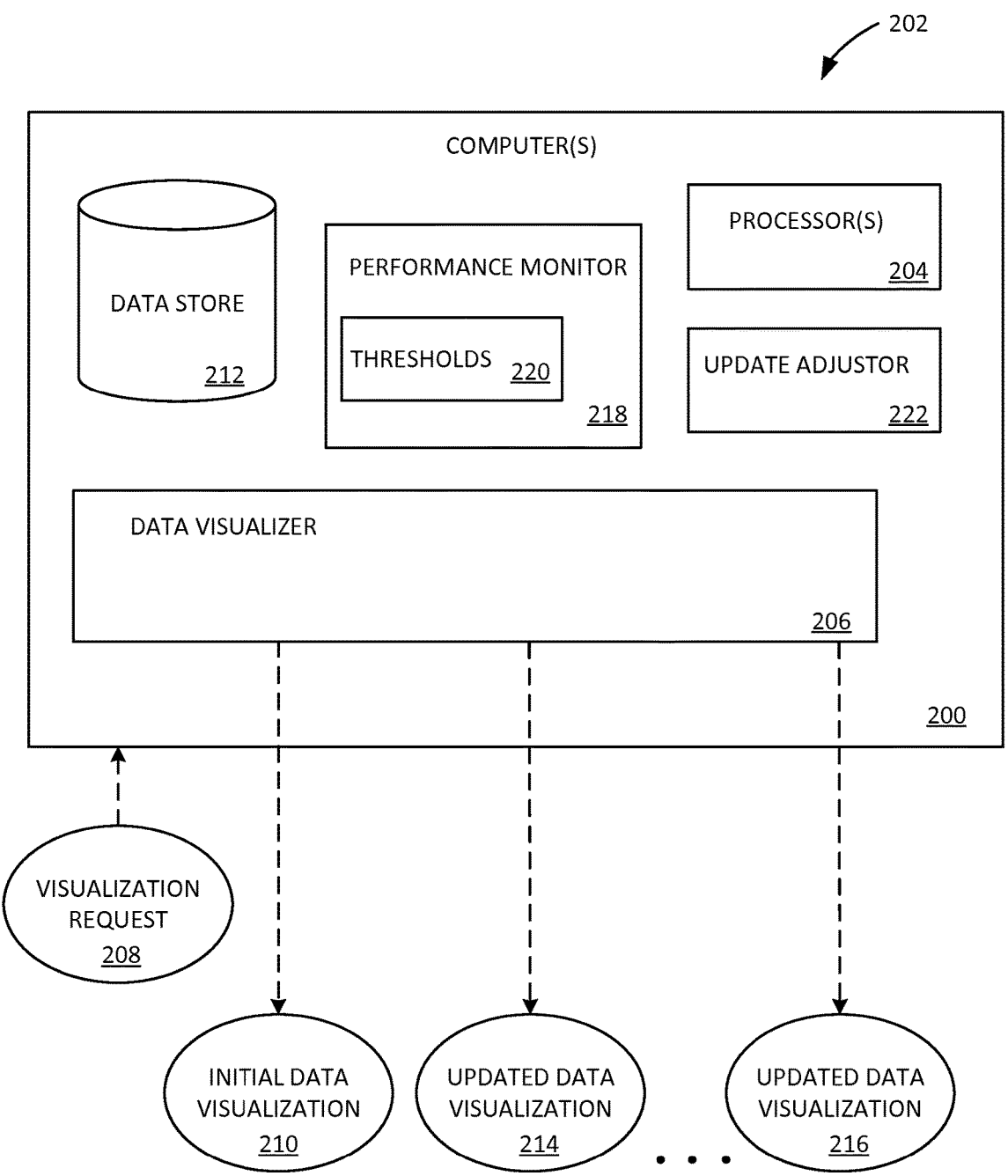
FIG. 2 is an example system configured to automatically monitor and adjust a dynamic data visualization.
Figure 3:
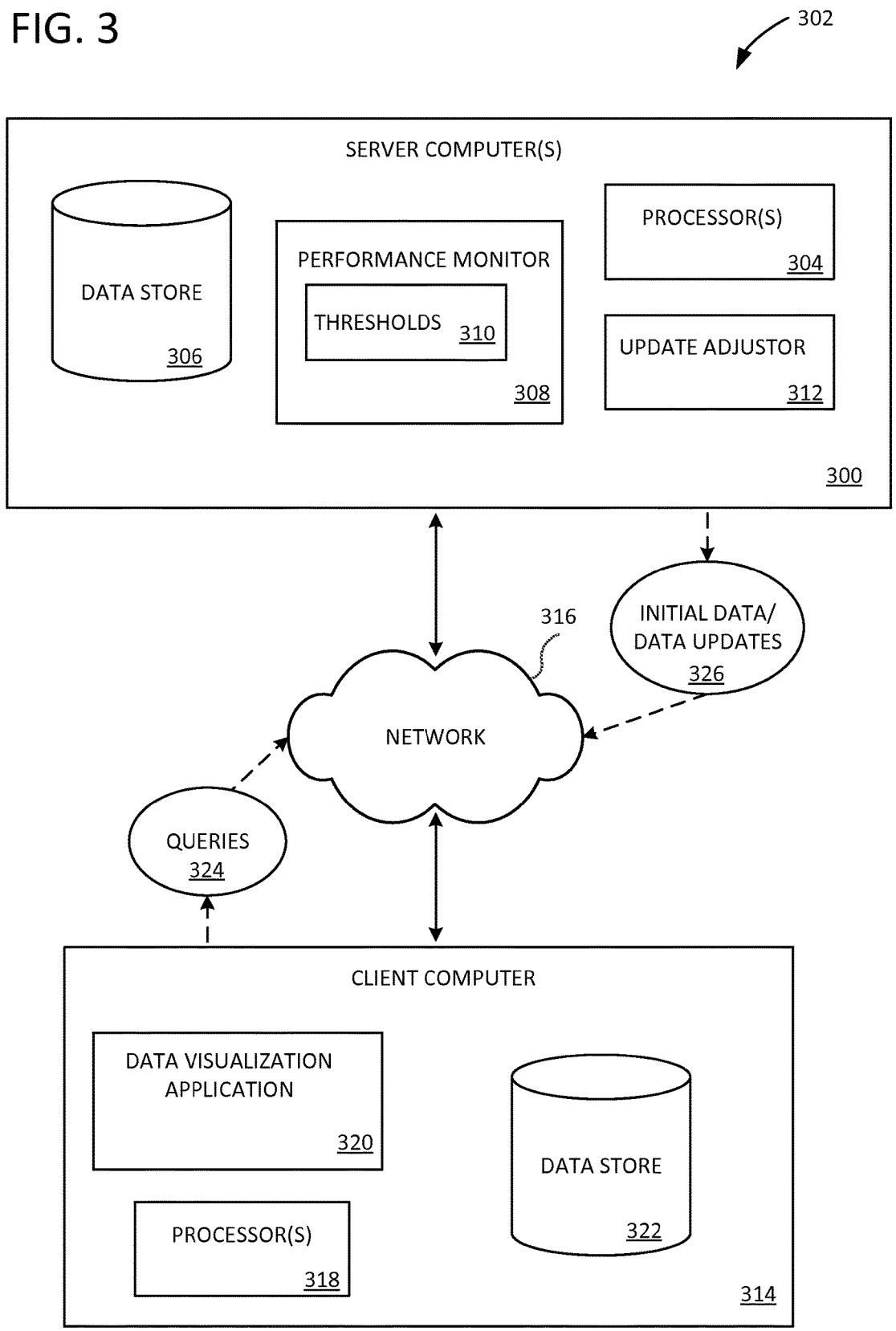
FIG. 3 is an example system configured to automatically monitor and adjust a dynamic data visualization, the system including a client computer executing a data visualization web application.

FIG. 2 illustrates one or more computer(s) 200 implementing a system 202. System 202 includes one or more processors 204 and a data visualizer 206. Data visualizer 206 is configured to receive a data visualization request 208 (e.g., submitted by a user). Data visualizer 206 is further configured to, by the one or more processors 204, generate an initial data visualization 210 reflecting initial data stored in data store 212 and specified by visualization request 208. Data visualizer 206 can be further configured to query data store 212 for the data specified by visualization request 208. Data store 212 can be, for example, an in-memory columnar relational database or other database or data store. In some examples, data store 212 is external to computer(s) 200. For example, data store 212 can be part of one or more server computers in communication with computer(s) 200 over the Internet or other network. An example of such an arrangement is illustrated in FIG. 3. Data visualizer 206 is also configured to, for respective data updates of a plurality of data updates, generate updated data visualizations 214-216 based on the data updates. In some examples, data visualizer 206 generates an updated data visualization each time a data update is received.

A performance monitor 218 is configured to, by the one or more processors 204, compare various performance metrics to corresponding thresholds 220. Performance monitor 218 can be configured to compare, to a first time threshold of thresholds 220, a rendering time of (i) initial data visualization 210 or (i) an updated data visualization (e.g., updated data visualization 214-216) for the respective data updates. Performance monitor 218 can also be configured to compare, to a second time threshold of thresholds 220, a data transfer time of one of the plurality of data updates transmitted to computer(s) 200. Performance monitor 220 can further be configured to compare, to a third time threshold of thresholds 220, a data update generation time of one of the plurality of data updates. In this way, performance monitor 218 is configured to track various aspects of the data visualization process and identify when the performance of the various aspects falls outside of desired ranges. The first, second, and third time thresholds can be user-selectable or determined by performance monitor 218 or other component.

An update adjustor 222 is configured to make changes to the way in which a data visualization is updated when performance issues are identified. Update adjustor 222 is configured to, by the one or more processors 204 and in response to a determination by performance monitor 218 that the first, second, or third time threshold has been exceeded: increase a time between a most recent data update and a next data update of the plurality of data updates; request sampled data for the next data update; or reduce a time-dimension extent of a next updated data visualization generated for the next data update.

FIG. 2 illustrates data visualizer 206, data store 212, performance monitor 218, and update adjustor 222 as all being part of computer(s) 200. In some examples one or more of these components are external to computer(s) 200. For example, data store 212 can be located on a remote server computer accessed through a network. In other examples, one or more of data store 212, performance monitor 218, and/or update adjustor 222 are located on a remote server computer. Various configurations of system 202 are contemplated in which different components are located on various computer(s) and/or networks.

FIG. 3 illustrates one or more server computer(s) 300 implementing a system 302. System 302 includes processor(s) 304, data store 306, performance monitor 308 storing thresholds 310, and update adjustor 312. The functionality of these components can be, for example, similar to that described for the corresponding components in FIG. 2.

The components of system 302 are accessible to client computer 314 over a network 316. Network 316 can be the Internet, a LAN, a wireless local area network (WLAN), a wide area network (WAN), or other type of network, wired or wireless. Client computer 314 includes processor(s) 318 that executes a data visualization application 320. Client computer 314 also includes a local data store 322. Data visualization application 320 can have functionality similar to data visualizer 206 of FIG. 2. Data visualization application 320 can, for example, be a web application run through a browser and can be configured to interact with the components of system 302 via network 316. Data visualization application 320 can also be a locally installed application that interacts with data stored remotely (e.g., in data store 306 on server computer(s) 300).

Data visualization application 320 can submit queries 324 (e.g., an initial query and periodic updates), via network 316, to system 302. Queries 324 can reflect a visualization request specified by a user. Data satisfying queries 324 can be retrieved from data store 306 and transmitted as initial data/data updates 326 over network 316. In FIG. 3, a data transfer time can be the time between transferring a data update from server computer(s) 300 to data visualization application 320. A data update generation time can be the time taken to retrieve data specified by a query of queries 324 from data store 306 and perform any processing, sorting, sampling, etc. A data visualization rendering time is the time taken by data visualization application 320 to render an initial data visualization or update the initial data visualization based on the initial data/data updates 326 received from server computer(s) 300.

Various performance metrics compared by performance monitor 308 to thresholds 310 can be obtained from queries 324. For example, a query requesting updated data can include the rendering time of the previous update to the data visualization. The query can also include the data transfer time for the previous data update. The data transfer time can be determined by identifying a time of arrival of the data update and subtracting a time that transmission of the data update began. The time transmission began can be stored with or communicated with the data update. Various known approaches to synchronization and determination of transfer time can also be used. In some examples, rather than being communicated as part of a query, performance metrics can be sent as a separate communication. In some examples, performance monitor 308 is also or alternatively implemented on client computer 314.

Some performance metrics, for example a data update generation time, can be obtained from server computer(s) 300 may not be communicated from client computer 314. For examples in which performance monitor 308 is implemented on client computer 314, however, some performance metrics are communicated from server computer(s) 300. For example, the data update generation time can be transmitted along with a data update. As another example, a client-side performance monitor can track visualization rendering times, determine data update transmission times, etc., and performance monitor 308 can track data update generation times on server computer(s) 300.

FIGS. 2 and 3 can also include other components that are not illustrated in the figures. For example, a Node Js application can be used to transfer high-velocity data over web sockets for live data streaming to client computer 314.

In FIGS. 2 and 3, the arrows indicating inputs and outputs and communication of different components are only an example. Any of the components illustrated in FIGS. 2 and 3 can be in communication with any other components. The components shown in system 202 of FIG. 2 and system 302 of FIG. 3 can perform any of the methods described herein.

Figure 4:
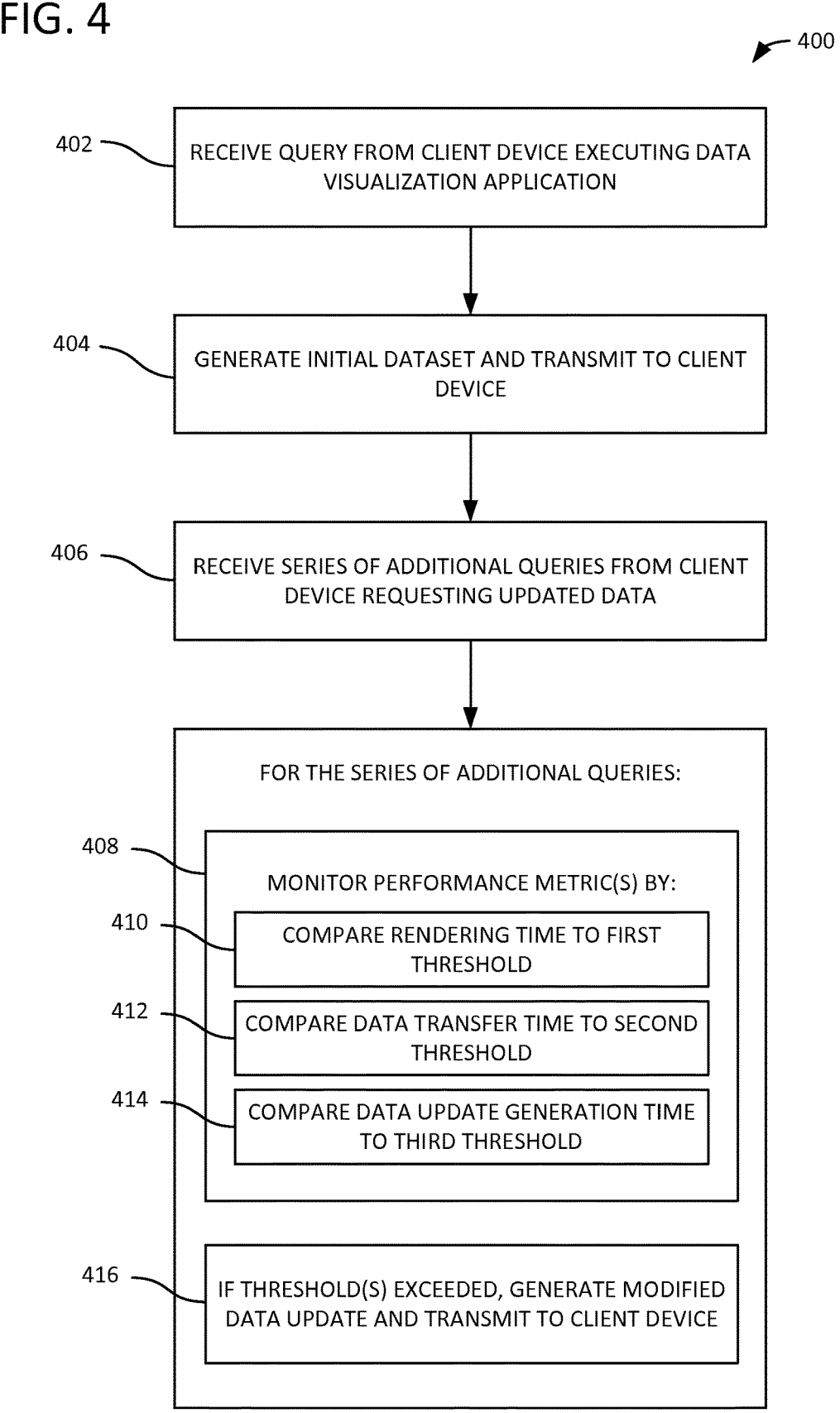
FIG. 4 is an example method for monitoring and adjusting a dynamic data visualization in which one or more of three performance metrics are monitored.

FIG. 4 illustrates a method 400 of automatically monitoring and adjusting a data visualization. Method 400 can be performed, for example, at one or more server computers remote from a client device. In process block 402, a query is received from the client device executing a data visualization application. In process block 404, in response to the query, an initial dataset is generated and transmitted to the client device. In process block 406, a series of additional queries requesting updated data are received from the client device. The series of additional queries can be submitted periodically. In some examples, the initial query includes instructions to provide updated query results periodically. Process blocks 408 and 416 are performed for the series of additional queries.

In process block 408, one or more performance metrics are monitored. In some examples, the one or more performance metrics are monitored each time an additional query of the series of additional queries is received in process block 406. The monitoring can comprise at least one of process blocks 410, 412, or 414. In process block 410, a rendering time of a data visualization generated by the data visualization application executing on the client device is compared to a first threshold. The rendering time can be provided by the data visualization application. A data transfer time of a data update transmitted from one or more server computers to the client device in response to an additional query of the series of additional queries is compared to a second threshold in process block 412. In process block 414, a data update generation time of the data update transmitted from one or more server computers to the client device in response to the additional query of the series of additional queries is compared to a third threshold. In some examples, monitoring the one or more performance metrics comprises comparing to the first threshold, comparing to the second threshold, and comparing to a third threshold. In other examples, the monitoring can comprise comparing to one or two of the thresholds.

In process block 416, upon determining that at least one of the first, second, or third thresholds has been exceeded: a modified data update is generated and transmitted to the client device. The modified data update can be generated by, for example: increasing a time between transmission of a previous data update and transmission of the modified data update; sampling data for the modified data update such that the modified data update comprises fewer data points than the previous data update; and/or reducing a time-dimension extent of data included in the modified data update.

In some examples, when it is determined that the first threshold has been exceeded, generating the modified data update comprises increasing a time between transmission of a previous data update and transmission of the modified data update. In some examples, when it is determined that the second threshold has been exceeded, generating the modified data update comprises sampling data for the modified data update such that the modified data update comprises fewer data points than a previous data update. In some examples, when it is determined that the third threshold has been exceeded, generating the modified data update comprises at least one of: (i) reducing a time-dimension extent of data included in the modified data update or (ii) sampling data for the modified data update such that the modified data update comprises fewer data points than a previous data update.

Figure 5:
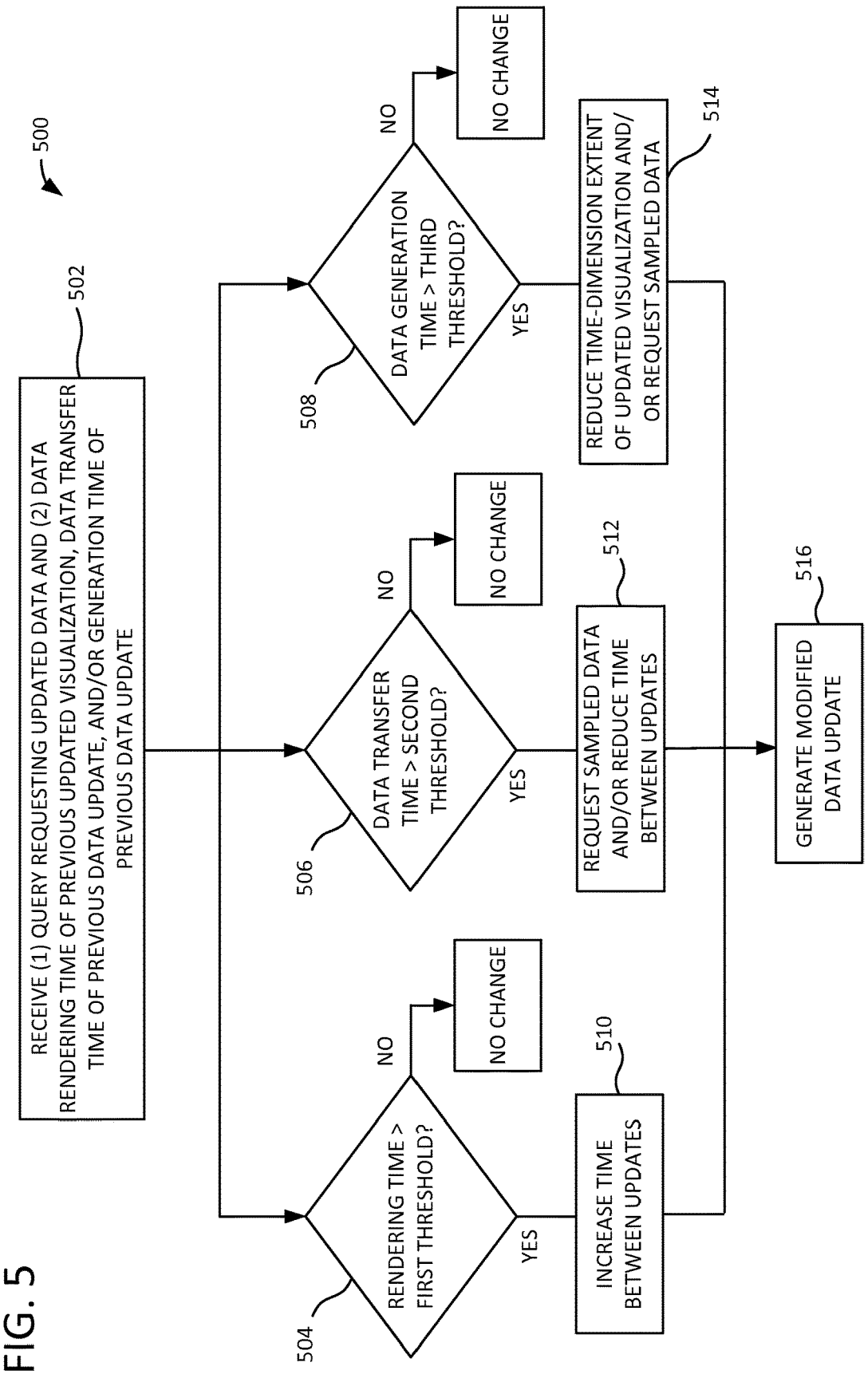
FIG. 5 is an example flow chart illustrating the monitoring of different performance metrics and actions taken as a result of the monitoring.

FIG. 5 illustrates a flow chart 500 of an example in which three performance metrics are compared to three different thresholds and a modified data update is generated as a result. In process block 502, a query requesting updated data is received. A data rendering time of a previous updated data visualization, a data transfer time of a previous data update, and/or a generation time of a previous update are also received in process block 502. Based on this information, various performance metrics can be monitored, as shown in decision blocks 504, 506, and 508. In process block 504, a visualization rendering time is compared to a first threshold. If the visualization rendering time is less than the first threshold, no change is made to future data updates. If the visualization rendering time is greater than the first threshold, then a time between subsequent updates is increased in process block 510. More time between updates reduces lag by allowing a data visualization application to finish rendering an updated visualization before the next data update is received.

In decision block 506, a data transfer time is compared to a second threshold. If the data transfer time is less than the second threshold, then no change is made to future data updates. If the data transfer time is greater than the second threshold, then sampled data are requested and/or the time between subsequent data updates is reduced in process block 512. In decision block 508, a data generation time of a data update is compared to a third threshold. If the data generation time is less than the third threshold, no changes are made to future data updates. If the data generation time is greater than the third threshold, a time-dimension extent of an updated data visualization is reduced and/or sampled data is requested. When the time dimension extent is reduced, the next data update requests, for example, only a most recent time window of data (e.g., 5, 10, 30, etc. seconds) is requested. In process block 516, a modified data update is generated based on at least one of process blocks 510, 512, or 514. In some examples, only one update modification action is taken at a time, but in other examples, multiple actions are taken depending upon which thresholds are exceeded.

Figure 6:
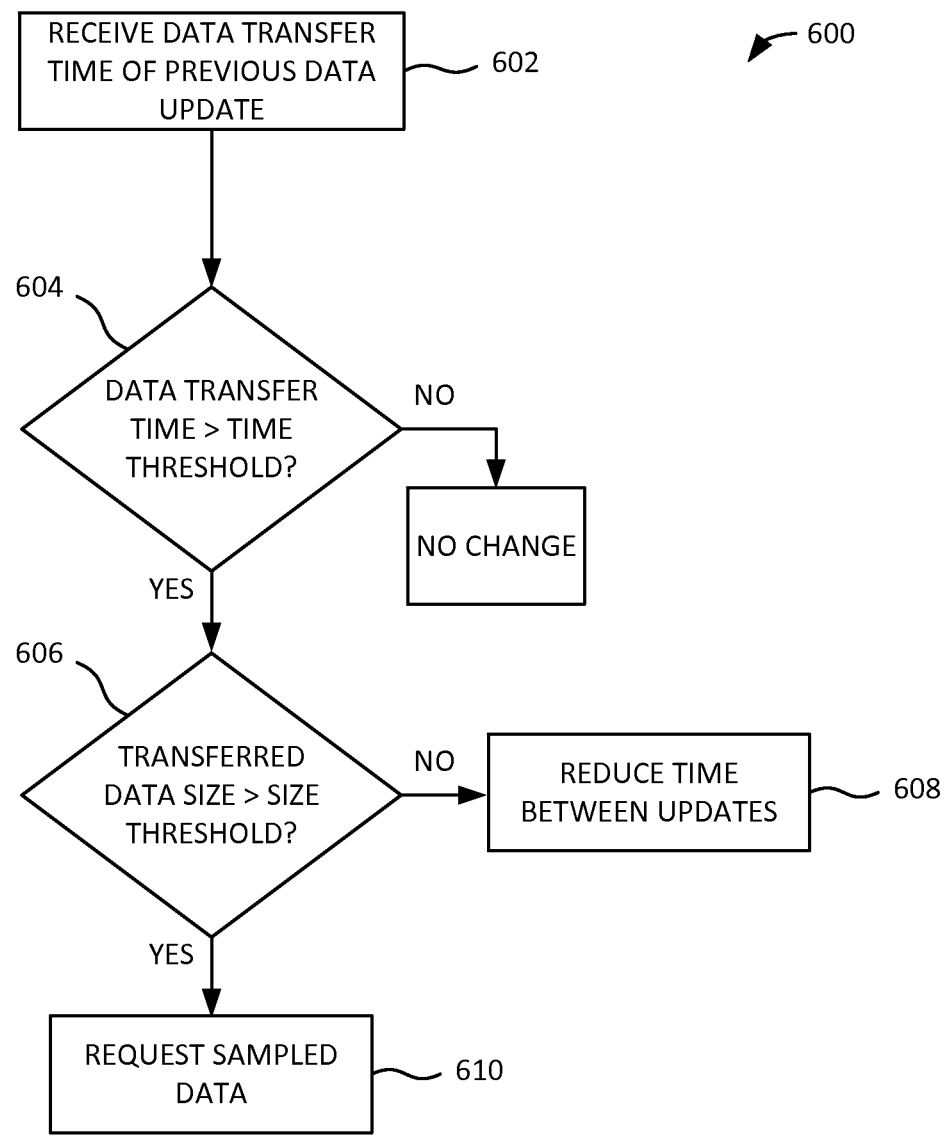
FIG. 6 is an example flow chart illustrating monitoring of a data transfer time.

FIG. 6 illustrates an additional example method 600 of comparing a data transfer time to a threshold. In process block 602, a data transfer time of a previous data update is received. In decision block 604, the data transfer time is compared to a time threshold. If the data transfer time is below the threshold, then no change is made. If the data transfer time exceeds the threshold, then a transferred data size is compared to a size threshold in decision block 606. The size threshold can be, for example, a data volume (e.g., 10 MB, 1 GB, etc. of data) or a number of data records. If the size of the transferred data is less than the threshold, then the time between subsequent data updates is reduced in process block 608. If the size of the transferred data exceeds the threshold, then sampled data is requested in process block 610.

Figure 7:
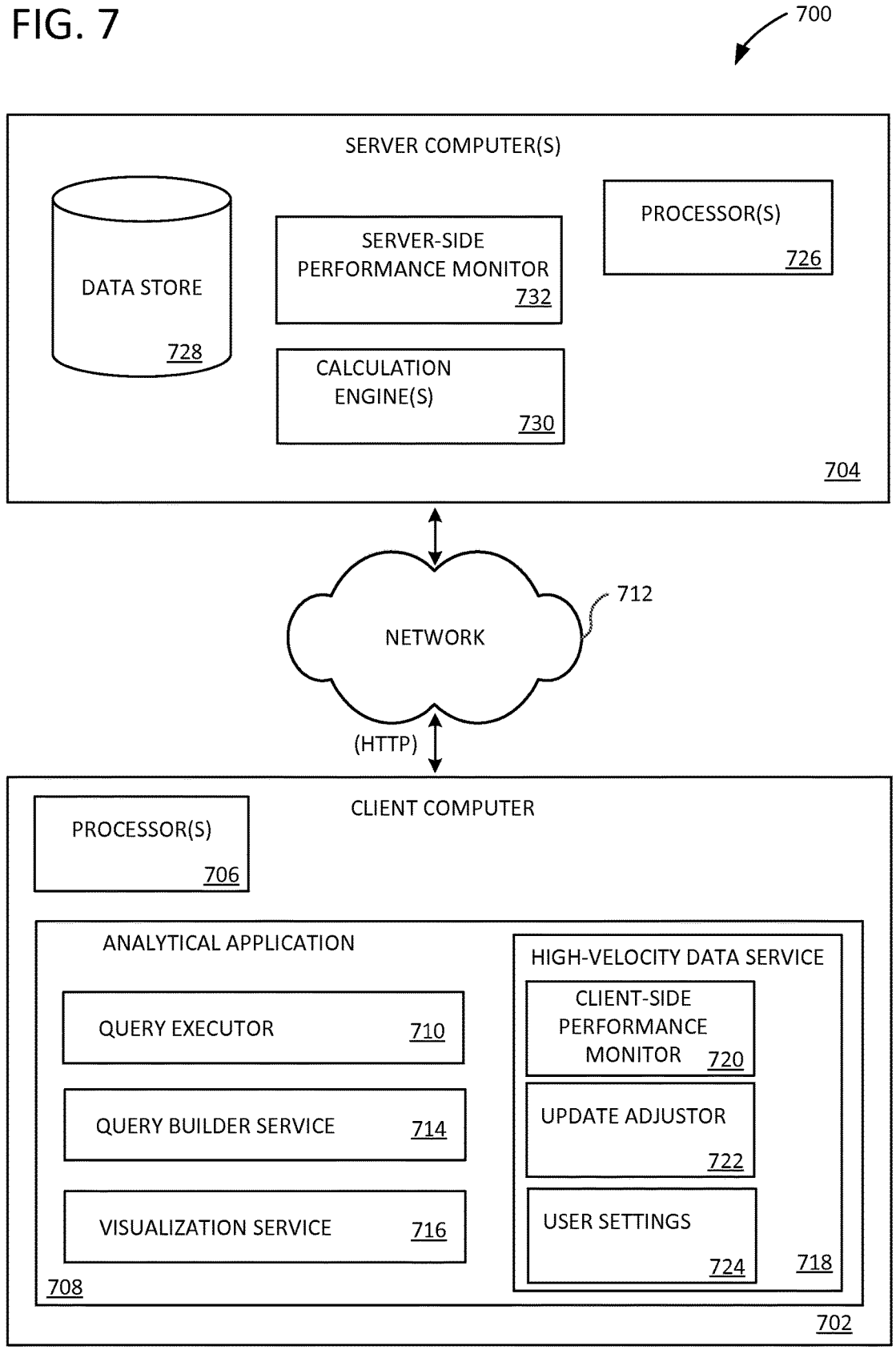
FIG. 7 is an example system configured to automatically monitor and adjust a dynamic data visualization in which performance monitoring is performed on both the client and server.

FIG. 7 illustrates a system 700 in which performance monitoring functionality is implemented on both a client computer 702 and server computer(s) 704. Client computer 702 includes processor(s) 706 and executes an analytical application 708. Analytical application 708 can be a web application, for example, and can include various functionality, including functionality implemented as web services (services). Analytical application 708 includes a query executor 710 configured to submit a query to server computer(s) 704 over network 712 (e.g., via hypertext transfer protocol (HTTP)). Query builder service 714 is configured to provide an interface for a user to specify, for example, a structured query language (SQL) query or other type of query. Queries built using query builder service 714 can be provided to query executor 710. Visualization service 716 is configured to generate a data visualization based on query results received from server computer(s) 704.

Analytical application 708 also includes a high-velocity data service 718. High-velocity data service 718 includes a client-side performance monitor 720, an update adjustor 722, and user settings 724. High-velocity data service 718 can be configured to implement functionality similar to, for example, performance monitor 218 and update adjustor 222 of FIG. 2 and/or performance monitor 308 and/or update adjustor 312 of FIG. 3. Client-side performance monitor 720 is configured to monitor data visualization rendering times, determine data update transmission times from server computer(s) 704 to client computer 702, and receive data update generation times from server computer(s) 704. Update adjustor 722 is configured to modify the way in which a data visualization is updated when performance issues are identified. For example, update adjustor 722 can communicate with query executor 710 to modify queries.

User settings 724 reflect a user's specified preferences for modifying queries. Some users may prefer to view the entire time-dimension extent of data in the data visualization, while others may be more concerned with the most recent data and/or viewing the most recent data at a fine granularity. User settings 724 allow update adjustor 722 to take actions preferred by the user to keep the data visualization updated, as discussed with reference to FIG. 1.

Server computer(s) 704 include processor(s) 726 and data store 728. Data store 728 can be, for example, an in-memory, columnar relational database or other data store. Data is retrieved from data store 728 by calculation engine(s) 730 as a result of queries sent by client computer 702. Calculation engine(s) 730 can include, for example, an online analytical processing (OLAP) engine, join engine, or other engine. Server-side performance monitor 732 tracks data update generation time for data updates generated in response to queries and provided to client computer 702.

Detailed Example of a Racing Simulation

To further illustrate the described examples, a detailed example of a racing simulation is presented in which high-velocity data is produced. In a racing simulation in which several cars are racing along a track, it is desirable to reduce latency between a data visualization presenting location or other status in the race and the underlying source data. For this example, it is assumed that each car generates a data record every five milliseconds (ms). The record includes an (x, y) position on the race track, revolutions per minute (RPM), speed, and current time. The records are stored in a table with, for example, the following schema: AUTOMOBILE_ID (int); TIME (TIMESTAMP); POSITION_X (Double); SPEED (Double); RPM (Double); and SAMPLE_NUM (between 0 and 1). SAMPLE_NUM is an indication of how far along in the race a data point is, with 0 representing the start of the race and 1 representing the end. Five cars are racing for 10 laps, and each lap takes roughly 60 seconds. Every second, 1000 records are generated. By the end of the race, approximately 600,000 records (1000× (10×60)) are produced. Such a large number of data points is extremely difficult to render in a data visualization.

An initial data visualization is generated using the following initial conditions: no filters on the underlying data, average speed and RPMs to 100 ms granularity; update frequency for requesting/receiving updated data and updating the data visualization of 100 ms. Three performance metrics are monitored: data update generation time; data transfer time from server (where, e.g., the database storing data can be located) to client; and data rendering time in client (where, e.g., a data visualization application can be executing).

Based on the above conditions and setup of the racing simulation, auto-monitoring and adjustment of the data visualization can be performed as follows. For the rendering time, if the rendering time in the client exceeds a time threshold (e.g., 100 ms) and the size of the data is less than a size threshold (e.g., 1000 records), then the update frequency for future updates is increased to 1.5× the rendering time. The time between updates is increased so that if the client cannot keep up with the rendering of all data received from, e.g., a backend, then the time between updates can be increased to reduce unnecessary load on the backend. If these conditions are not met, updates continue with the initial 100 ms frequency.

For the data transfer time, if the data transfer time both exceeds a time threshold (e.g., 100 ms) and exceeds a size threshold (e.g., 5000 records), then data points are sampled over a larger time interval. For example, a current sampling interval over which values are averaged (e.g., 100 ms) can be increased by multiplying by 1.15 or other factor as many times as needed to reduce the number of records below the size threshold. If the data transfer time exceeds the time threshold but is less than the size threshold, then the time between data updates is reduced (e.g., to 50 ms). A smaller time between updates results in less new data to transfer, reducing the transfer time and allowing the client to receive updated data faster.

For the data update generation time, if the data update generation time exceeds a time threshold (e.g., 100 ms), then two different approaches can be taken (which can be determined by a default choice or user-specified preference). Either the time-dimension extent of the visualization can be reduced such that fewer records need to be retrieved and processed, or sampling can be used. Sampling can involve, for example, sampling over all sampling intervals (e.g., over each 500 ms or one-second interval) or aggregating all records where SAMPLE_NUM falls between 0.2 and 0.8, which provides fine granularity information at the beginning and end of the race with averaged information over most of the middle of the race.

User preferences can also be enabled to allow users to select some data update modifications that are either preferred or disfavored. In the racing example, some users may prefer to view the entire race, even at a lower granularity (i.e., with sampled data), while other users may prefer to view fine granularity data for recent/current portions of the race while not being interested in what happened more than five or 10 seconds before the current time.

In the racing example, the amount of data generated per unit time is relatively constant, but performance metrics can still vary depending upon other processes running, changes in available bandwidth, etc., and the monitoring allows data updates to be adjusted with each iteration to accommodate this. In other examples, the amount of high-velocity data generated can vary with time, and the described auto-monitoring and adjustment of data updates allows a data visualization to remain up-to-date despite the changes in the amount of data being generated.

Examples of Computing Environments

Figure 8:
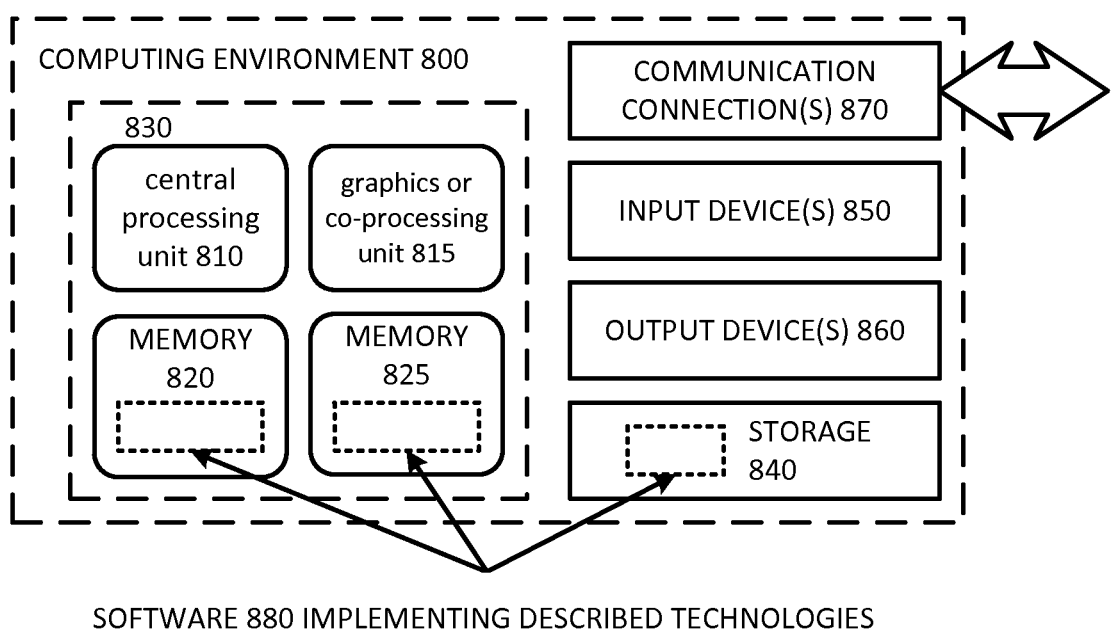
FIG. 8 is a diagram illustrating a generalized implementation environment in which some described examples can be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, media player, gaming system, mobile device, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power.

For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, memory 820 and 825 and software 880 can store computer-executable instructions for auto-monitoring and adjusting a dynamic data visualization. Computing environment 800 can include, for example, data visualizer 206, performance monitor 218, and update adjustor 222 of FIG. 2; data visualization web application 322, performance monitor 308, and update adjustor 312 of FIG. 3; or high-velocity data service 718 of FIG. 7.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. For video encoding, the input device(s) 850 may be a camera, video card, TV tuner card, or similar device that accepts video input in analog or digital form, or a CD-ROM or CD-RW that reads video samples into the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. One or more computer-readable storage media storing computer-executable instructions for:
   generating a data visualization;
   receiving a series of data updates;
   updating the data visualization based on the series of data updates;
   monitoring a performance metric for a previous data update, wherein the monitored performance metric is at least one of:
   a data transfer time for the previous data update, comprising a calculated first time to complete a data update transmission from one or more server computers and a data size for the completed data transmission; or a data update generation time for the previous data update, comprising a second time to retrieve data specified by a query of queries from a data store and to perform related processing; and adjusting the updating of the data visualization, wherein said adjusting comprises:

upon determining that the first time exceeds a first time threshold, determining whether the size exceeds a size threshold, and:

if the determined size exceeds the size threshold, increasing a sampling interval time, and if the size does not exceed the size threshold, reducing a time between data updates; or upon determining that the second time exceeds a second time threshold:

requesting or generating sampled data for subsequent data updates of the series of data updates; or reducing a time-dimension extent of the updated data visualization.

2. The one or more computer-readable storage media of claim 1, wherein monitoring the performance metric comprises monitoring both the data transfer time and the data update generation time and determining that both the first and second times exceed the first and second time thresholds, respectively, and responsive to the determination, performing the adjusting.

3. The one or more computer-readable storage media of claim 1, wherein the determining that the performance metric exceeds a threshold further comprises determining that the rendering time of an updated data visualization exceeds the threshold, and wherein the adjusting comprises increasing the time between data updates of the series of data updates to a time greater than the rendering time.

4. The one or more computer-readable storage media of claim 3, wherein the determining that the performance metric exceeds a threshold further comprises determining that a number of data records transmitted in a most recent data update does not exceed a second threshold.

5. The one or more computer-readable storage media of claim 1, wherein the determining that the performance metric exceeds a threshold comprises determining that the data transfer time, from one or more server computers to a client computer, of a data update of the series of data updates exceeds the threshold, and wherein the performing comprises requesting sampled data for subsequent data updates of the series of data updates.

6. The one or more computer-readable storage media of claim 5, wherein the determining that the performance metric exceeds a threshold further comprises determining that a number of data records in a most recent data update exceeds a second threshold.

7. The one or more computer-readable storage media of claim 1, wherein the determining that the performance metric exceeds a threshold comprises determining that the data update generation time, at one or more server computers, of a data update of the series of data updates exceeds the threshold.

8. The one or more computer-readable storage media of claim 7, wherein the performing comprises at least one of reducing a time-dimension extent of the updated data visualization or requesting sampled data for subsequent data updates of the series of data updates.

9. The one or more computer-readable storage media of claim 1, wherein the sampled data covers a sampling period comprising two or more intervals, and further wherein data in a first sampling interval is aggregated, while data in a second sampling interval is not aggregated.

10. A method, comprising:

receiving a query from a client device executing a data visualization application;

in response to the query, generating an initial dataset and transmitting the initial dataset to the client device;

receiving, from the client device, a series of additional queries requesting updated data; and for the series of additional queries:

monitoring performance metrics each comprising a monitored time for performing one or more completed tasks, the monitoring comprising:

comparing, to a first time threshold, a monitored rendering time of a previous data visualization generated by the data visualization application executing on the client device;

comparing, to a second time threshold, a monitored data transfer time to complete a previous data update transmitted from one or more server computers to the client device in response to an additional query of the series of additional queries; and comparing, to a third time threshold, a monitored data update generation time of the previous data update transmitted from one or more server computers to the client device in response to the additional query of the series of additional queries; and determining that the monitored time for performing the one or more tasks has exceeded at least one of the first, second, or third thresholds and adjusting future data updates accordingly, comprising:

determining that the first time exceeds the first time threshold, and, in response:

increasing a time between data updates to a time greater than the rendering time;

determining that the second time exceeds the second time threshold, and, in response:

determining whether a data size for the completed data transmission exceeds a size threshold, and:

if the determined size exceeds the size threshold, increasing a sampling interval time, and if the size does not exceed the size threshold, reducing a time between data updates; or determining that the third time exceeds the third time threshold, and in response:

requesting or generating sampled data for subsequent data updates of the series of data updates; or reducing a time-dimension extent of the updated data visualization;

generating a modified data update; and transmitting the modified data update to the client device.

11. The method of claim 10, wherein the modified data update is generated by: increasing a time between transmission of a previous data update and transmission of the modified data update; sampling data for the modified data update such that the modified data update comprises fewer data points than the previous data update; or reducing a time-dimension extent of data included in the modified data update.

12. The method of claim 10, wherein it is determined that the first threshold has been exceeded, and wherein generating the modified data update comprises increasing a time between transmission of a previous data update and transmission of the modified data update.

13. The method of claim 10, wherein it is determined that the second threshold has been exceeded, and wherein generating the modified data update comprises sampling data for the modified data update such that the modified data update comprises fewer data points than a previous data update.

14. The method of claim 10, wherein it is determined that the third threshold has been exceeded, and wherein generating the modified data update comprises at least one of: (i) reducing a time-dimension extent of data included in the modified data update or (ii) sampling data for the modified data update such that the modified data update comprises fewer data points than a previous data update.

15. The method of claim 10, wherein the monitoring the one or more performance metrics is performed each time an additional query of the series of additional queries is received.

16. The method of claim 10, wherein the monitoring the one or more performance metrics comprises the comparing to the first threshold, the comparing to the second threshold, and the comparing to a third threshold.

17. One or more computing devices comprising:
one or more processors;
a data visualizer configured to, by the one or more processors:
  generate an initial data visualization reflecting initial data; and
  for respective data updates of a plurality of data updates, generate an updated data visualization based on the data update;
a performance monitor configured to, by the one or more processors:
  compare, to a first time threshold, a monitored rendering time of (i) the initial data visualization or (i) a previous updated data visualization for the respective data updates;
  compare, to a second time threshold, a monitored data transfer time of a previous one of the plurality of data updates transmitted to the one or more computing devices; and
  compare, to a third time threshold, a monitored data update generation time of a previous one of the plurality of data updates; and an update adjustor configured to, by the one or more processors and in response to a determination by the performance monitor that a plurality of: 1) the monitored rendering time, 2) the monitored data transfer time, and 3) the monitored data update generation time has exceeded its respective first, second, or third time threshold, perform at least two of the following:
  in response to determining that the first time exceeds the first time threshold, increase a time between a most recent data update and a next data update of the plurality of data updates;
  in response to determining that the second time exceeds the second time threshold:
    determine whether a data size for the completed data transmission exceeds a size threshold, and:
      if the determined size exceeds the size threshold, increasing a sampling interval time, and
      if the size does not exceed the size threshold, reducing a time between data updates; or
  in response to determining that the third time exceeds the third time threshold:
    request or generate sampled data for the next data update; or
    reduce a time-dimension extent of a next updated data visualization generated for the next data update.

18. The one or more computing devices of claim 17, wherein the respective data updates of the plurality of data updates are received by the one or more computing devices at periodic time intervals.

19. The one or more computing devices of claim 17, wherein the first, second, and third time thresholds are user-selectable times for completion of one or more tasks.

20. The one or more computing devices of claim 19, wherein the update adjustor is further configured to increase the time between the most recent data update and the next data update to a time greater than a rendering time of an updated data visualization upon determining that the rendering time of the updated data visualization exceeds the first time threshold.

* * * * *